(12) United States Patent  
Goeltzenleuchter

(10) Patent No.: US 10,705,631 B2
(45) Date of Patent: Jul. 7, 2020

(54) INTERACTIVE DISPLAY

(71) Applicant: Hewlett-Packard Development Company, L.P., Houston, TX (US)

(72) Inventor: Courtney D. Goeltzenleuchter, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 14/429,378

(22) PCT Filed: Nov. 6, 2012

(86) PCT No.: PCT/US2012/063728
§ 371 (c)(1),
(2) Date: Mar. 19, 2015

(87) PCT Pub. No.: WO2014/074090
PCT Pub. Date: May 15, 2014

(65) Prior Publication Data
US 2015/0261331 A1 Sep. 17, 2015

(51) Int. Cl.
*G06F 3/041* (2006.01)
*G06F 3/01* (2006.01)
(Continued)

(52) U.S. Cl.
CPC .............. *G06F 3/041* (2013.01); *G06F 3/017* (2013.01); *G06F 3/03* (2013.01); *G06F 3/03545* (2013.01);
(Continued)

(58) Field of Classification Search
CPC ........ G06F 3/03; G06F 3/017; G06F 3/03545; G06F 3/041; G06F 2203/04104;
(Continued)

(56) References Cited

U.S. PATENT DOCUMENTS 5,513,309 A * 4/1996 Meier ................. G06F 3/04845
345/179
6,008,819 A 12/1999 Robson et al.
(Continued)

FOREIGN PATENT DOCUMENTS

CN 1599895 3/2005
CN 101404745 4/2009
(Continued)

OTHER PUBLICATIONS

Haichuan Mu and David Klotzkin, "Measurement of Electron Mobility in Alq3 From Optical Modulation Measurements in Multilayer Organic Light-emitting Diodes," Journal of Display Technology, vol. 2, No. 4, Dec. 2006, pp. 341-346, IEEE.
(Continued)

*Primary Examiner* — Vinh T Lam
(74) *Attorney, Agent, or Firm* — Brooks Cameron & Huebsch PLLC

(57) ABSTRACT

Examples disclosed herein relate to an interactive display. Motion of an input device on a display screen is tracked and pixels of the display screen that have changed based on the tracked motion are updated. Portions of the display screen corresponding to the updated pixels are refreshed.

13 Claims, 4 Drawing Sheets

(51) Int. Cl.
*G06F 3/0354* (2013.01)
*G09G 3/3208* (2016.01)
*G06F 3/03* (2006.01)

(52) U.S. Cl.
CPC . *G09G 3/3208* (2013.01); *G06F 2203/04104* (2013.01); *G09G 2310/04* (2013.01); *G09G 2320/0252* (2013.01); *G09G 2340/0435* (2013.01); *G09G 2354/00* (2013.01)

(58) Field of Classification Search
CPC ......... G09G 3/3208; G09G 2340/0435; G09G 2310/04; G09G 2354/00; G09G 2320/0252
USPC ...................... 345/173–179; 178/18.01–20.01
See application file for complete search history.

(56) References Cited

U.S. PATENT DOCUMENTS

| | | | |
|---|---|---|---|
| 7,315,307 B2 | 1/2008 | Wilt et al. | |
| 7,724,242 B2 | 5/2010 | Hillis et al. | |
| 8,359,628 B2 | 1/2013 | Kitaru et al. | |
| 8,692,806 B2 | 4/2014 | Goertz | |
| 8,698,827 B2 | 4/2014 | Yajima et al. | |
| 2008/0309636 A1* | 12/2008 | Feng | G09G 3/344 345/173 |
| 2009/0091656 A1* | 4/2009 | Kitaru | G09G 5/003 348/554 |
| 2010/0079388 A1* | 4/2010 | Ohnishi | G06F 3/04845 345/173 |
| 2010/0231800 A1 | 9/2010 | White et al. | |
| 2010/0271313 A1* | 10/2010 | Low | G06F 3/0412 345/173 |
| 2010/0321402 A1 | 12/2010 | Han et al. | |
| 2011/0141032 A1* | 6/2011 | Liu | G06F 3/0416 345/173 |
| 2012/0127140 A1 | 5/2012 | Ryan et al. | |
| 2012/0127186 A1 | 5/2012 | Yajima et al. | |
| 2012/0139862 A1* | 6/2012 | Li | G06F 3/0482 345/173 |
| 2012/0188206 A1 | 7/2012 | Sparf et al. | |
| 2012/0327029 A1* | 12/2012 | Martin | G06F 3/0421 345/175 |
| 2013/0285919 A1* | 10/2013 | Larsen | G06F 3/041 345/173 |
| 2013/0314360 A1* | 11/2013 | Saitoh | G06F 3/0412 345/173 |
| 2014/0098072 A1* | 4/2014 | Singh | G06F 3/044 345/179 |
| 2014/0152590 A1* | 6/2014 | Brown | G06F 3/0416 345/173 |
| 2014/0253458 A1* | 9/2014 | Patel | G06F 40/274 345/173 |
| 2014/0340340 A1* | 11/2014 | Tsai | G06F 3/0412 345/173 |
| 2015/0009177 A1* | 1/2015 | Yamamoto | G06F 3/0414 345/174 |
| 2015/0289083 A1* | 10/2015 | Tsai | H04B 5/00 455/41.1 |

FOREIGN PATENT DOCUMENTS

| | | |
|---|---|---|
| CN | 101558371 | 10/2009 |
| CN | 101989397 A | 3/2011 |
| CN | 102473399 | 5/2012 |
| KR | 10-2005-0022555 A | 3/2005 |

OTHER PUBLICATIONS

International Search Report and Written Opinion, International Application No. PCT/US2012/063728, dated May 15, 2013, pp. 1-9.

Tuan Nguyen, "Video: World's Biggest Touchscreen Display is 82-Inch beast," Aug. 15, 2011, pp. 1-6, CBS Interactive.

\* cited by examiner

INTERACTIVE DISPLAY

BACKGROUND

Interactive displays have become increasingly popular in devices such as televisions, computers, cameras, smartphones, and the like. Interactive displays allow users to interact with such devices, for example, by providing input on a display surface using a pen, finger, stylus, or other devices. Accordingly, the responsiveness of an interactive display to user input can dramatically impact the user's experience with a device that incorporates an interactive display.

BRIEF DESCRIPTION OF THE DRAWINGS

Examples are described in the following detailed description and in reference to the drawings, in which.

DETAILED DESCRIPTION

Figure 1:
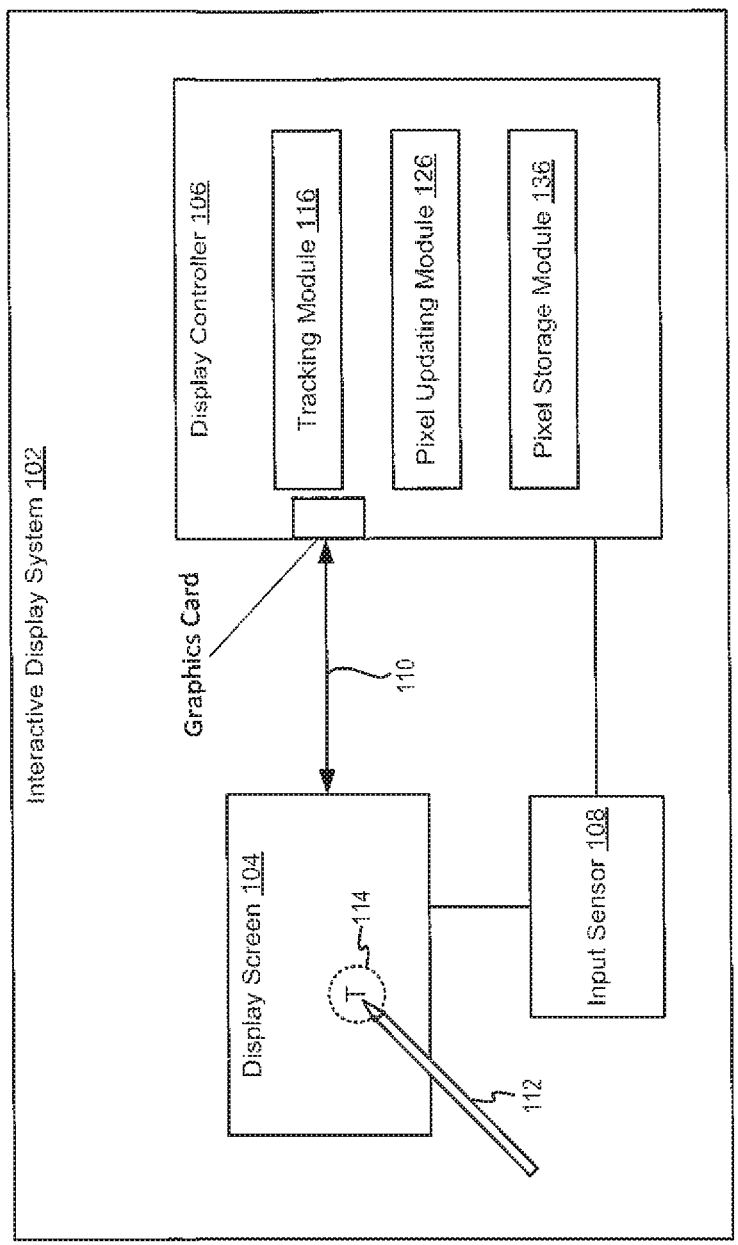
FIG. 1 depicts a block diagram of an interactive display system, according to one example.

Various aspects of the present disclosure are directed to an interactive display system. More precisely, various aspects of the present disclosure are directed to improving the responsiveness of an interactive display system.

Current interactive displays suffer from lags (e.g., response latency), where input or changes made by the user (e.g., via an input device) are not displayed in a timely manner. For example, a typical refresh rate of an interactive display is in the neighborhood of 60 Hz (or response time of about 16 milliseconds). The responsiveness of interactive displays to user inputs are limited by factors such as the refresh rate of the display, speed of the user input device (e.g., touch sensor or mouse), and the graphics card and display interconnect. Because of the above limitations, such interactive displays are unable to achieve response times of 1 ms or less, for example.

Various aspects of the present disclosure address at least the above by providing an interactive display with improved responsiveness to user input. For example, aspects of the present disclosure describe a high speed display interconnect between a display screen and a display controller to provide a fast changing interactive display. Further, the display controller is configured to retain display data (e.g., within pixels or in an integrated frame buffer) to allow for faster updates of the display screen. For example, by retaining display data, pixels of the display screen may be selectively updated such that less than a total number of pixels of the display screen are refreshed (e.g., only parts of the display that are changing are updated—partial screen refresh). Moreover, in some example implementations, the display controller has no artificial refresh rate limit. As a result, a response time of 1 ms or less may be achieved, thereby improving the user's experience by providing a more natural pen/pencil writing experience.

In one example in accordance with the present disclosure, an interactive display system is provided. The interactive display system includes a display screen (e.g., a touch-screen display, a touch-sensitive display, or a multi-touch display) coupled to a display controller via a high speed display interconnect. The interactive display system also includes an input sensor to track motion of an input device at a predetermined tracking rate. The display controller is to partially refresh the display screen when less than a total number of pixels of the display screen have changed and to retain image data. The image data may be retained within the pixels of the display screen or in an integrated frame buffer of the display controller. Accordingly, the display controller selectively updates pixels of the display screen that have changed based on motion of the input device on the display screen.

In another example in accordance with the present disclosure, a method for implementing an interactive display is provided. The method includes tracking motion of an input device on a display screen and updating pixels of the display screen that have changed based on the tracking. The method further includes refreshing portions of the display screen corresponding to the updated pixels, where less than a total number of pixels of the display screen are refreshed.

In still another example in accordance with the present disclosure, a non-transitory machine-readable medium is provided. The machine-readable medium includes instructions that, when executed, cause an interactive display system to track motion of an input device on a display screen and selectively update pixels of the display screen that have changed based on the tracked motion. The instructions, when executed, further cause the interactive display system to send the updated pixels to the display screen and refresh portions of the display screen corresponding to the updated pixels.

FIG. 1 depicts a block diagram of an interactive display system, according to one example. Interactive display system 102 includes a display screen 104, a display controller 106, and an input sensor 108. System 102 may also include a high speed display interconnect 110 to connect the display screen 104 to the display controller 106. For example, the high speed display interconnect 110 may connect the display screen 104 to a graphics card of the display controller 106.

Display screen 104 may be one of a touch-screen display, a touch-sensitive display, a multi-touch display, or any other interactive display. Display screen 104 may be configured to receive a user input via an input device 112. For example, a user may interact with the display screen 104 (e.g., provide an input) using the input device 112. Input device 112 may include a stylus, a hand gesture, a pointing device, a clicking device, a mouse, or any combination thereof. Further, display screen 104 may include an organic light-emitting diode (OLED) or any other display screen with a fast response time. For example, the response time may be 1 ms or less.

Input sensor 108 may be configured to track motion of the input device 112 at a predetermined tracking rate. For example, input sensor 108 may track the input device on the display screen 104 at a high tracking rate of at least 500 Hz. In certain examples, the tracking rate may be at least 1000 Hz. The motion of the input device 112 on the display screen 104 may cause certain pixels of the display screen to be changed. To illustrate, a user may input (e.g., write) the letter 'T' on the display screen 104 using the input device 112. The user input ('T') may cause pixels within a portion 114 of the display screen 104 to be changed or updated. Accordingly, input sensor 108 tracks, at a high rate, the motion of the input device 112 as 'T' is input onto the display screen 104.

Display controller 106 may be configured to selectively update pixels of the display screen 104 that have changed based on the tracked motion of the input device 112. Accordingly, the display controller 106 may partially refresh the display screen. For example, less than a total number of pixels of the display screen 104 are refreshed (e.g., portion 114 of the display screen 104). Thus, the display controller 106 may refresh only the portion 114 of the display screen 104 that has changed/updated based on the motion of the input device 112. Accordingly, less than the whole display screen 104 is refreshed and refreshed portions (e.g., portion 114) correspond to pixels that have been changed on the display screen 104. Therefore, a high display screen 104 refresh rate (e.g., 120 Hz) and fast response time (e.g., 1 ms or less) of the display screen 104 to user input may be achieved. It should be noted that the display controller 106, as described, has no artificial refresh rate limit. Further, power consumption of the system 102 may be reduced by updating and refreshing only parts of the display screen 104 that have changed.

Display controller 106 may further be configured to retain image data. For example, the image data may be retained within the pixels of the display screen 104 or in an integrated frame buffer of the display controller 106. By retaining image data, bandwidth is minimized by only updating parts of the display screen 104 that are changing. For example, by not updating all pixels of the display screen 104 when just a portion of the display screen 104 has changed, more updates per unit time may be achieved, thereby improving the response time of the display screen 104.

In certain examples, display controller 106 may include tracking module 116, pixel updating module 126, and pixel storage module 136. Tracking module 116 may be configured to receive tracked motion of the input device 112 from the input sensor 108, for example. In one example, input sensor 108 may be connected to the display controller 106 via a dedicated data path. Accordingly, motion input may be provided to the tracking module 116 of the display controller 116. Pixel updating module 126 may be configured to selectively update pixels of the display screen 104 that have changed based on motion of the input device 112 and partially refresh the display screen 104 based on the updated pixels. Pixel storage module 136 may be configured to retain image data. For example, the image data may be retained within pixels of the display screen or in an integrated frame buffer.

Figure 2:
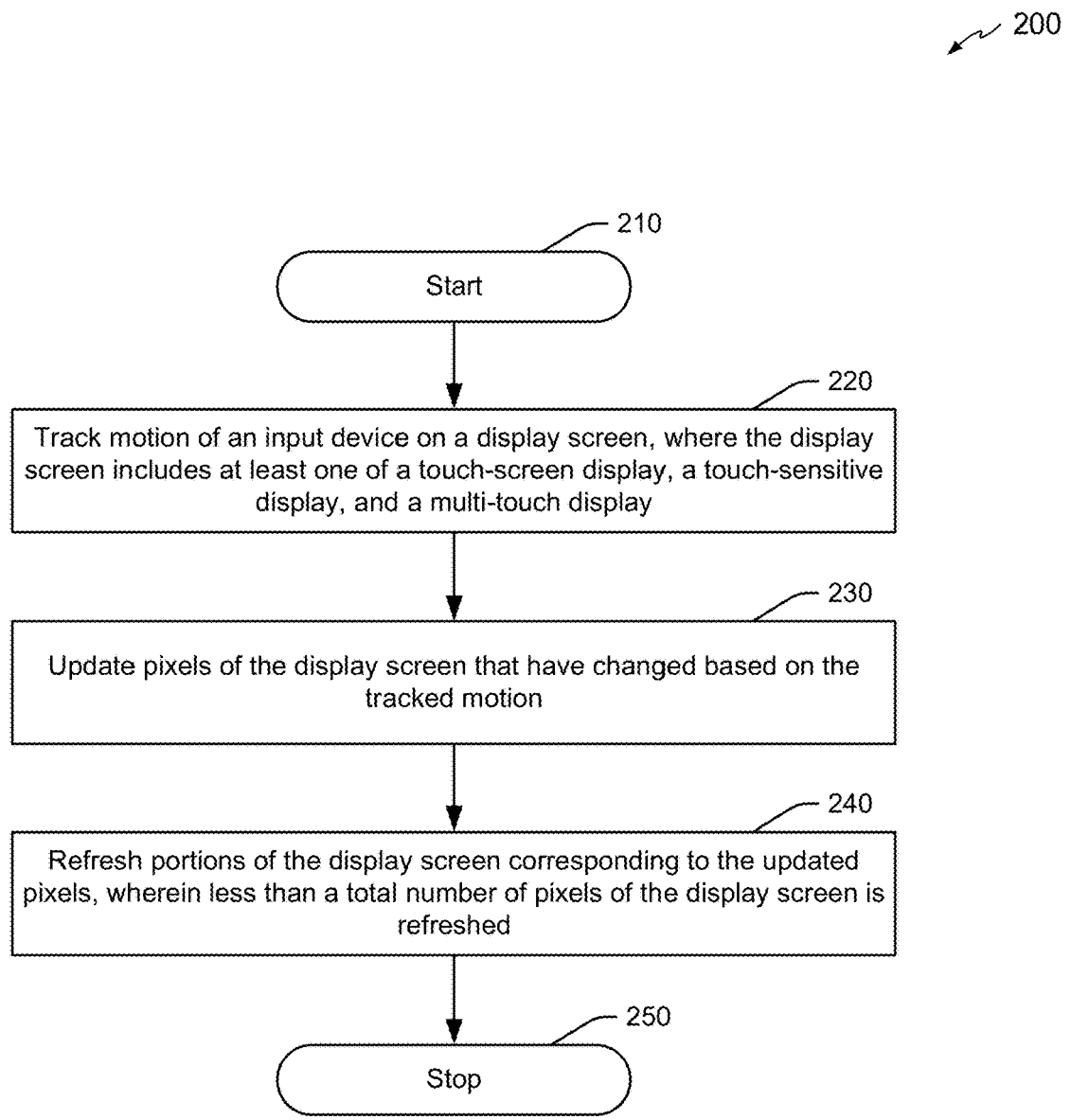
FIG. 2 depicts a flowchart of a method for implementing an interactive display, according to one example.
Figure 3:
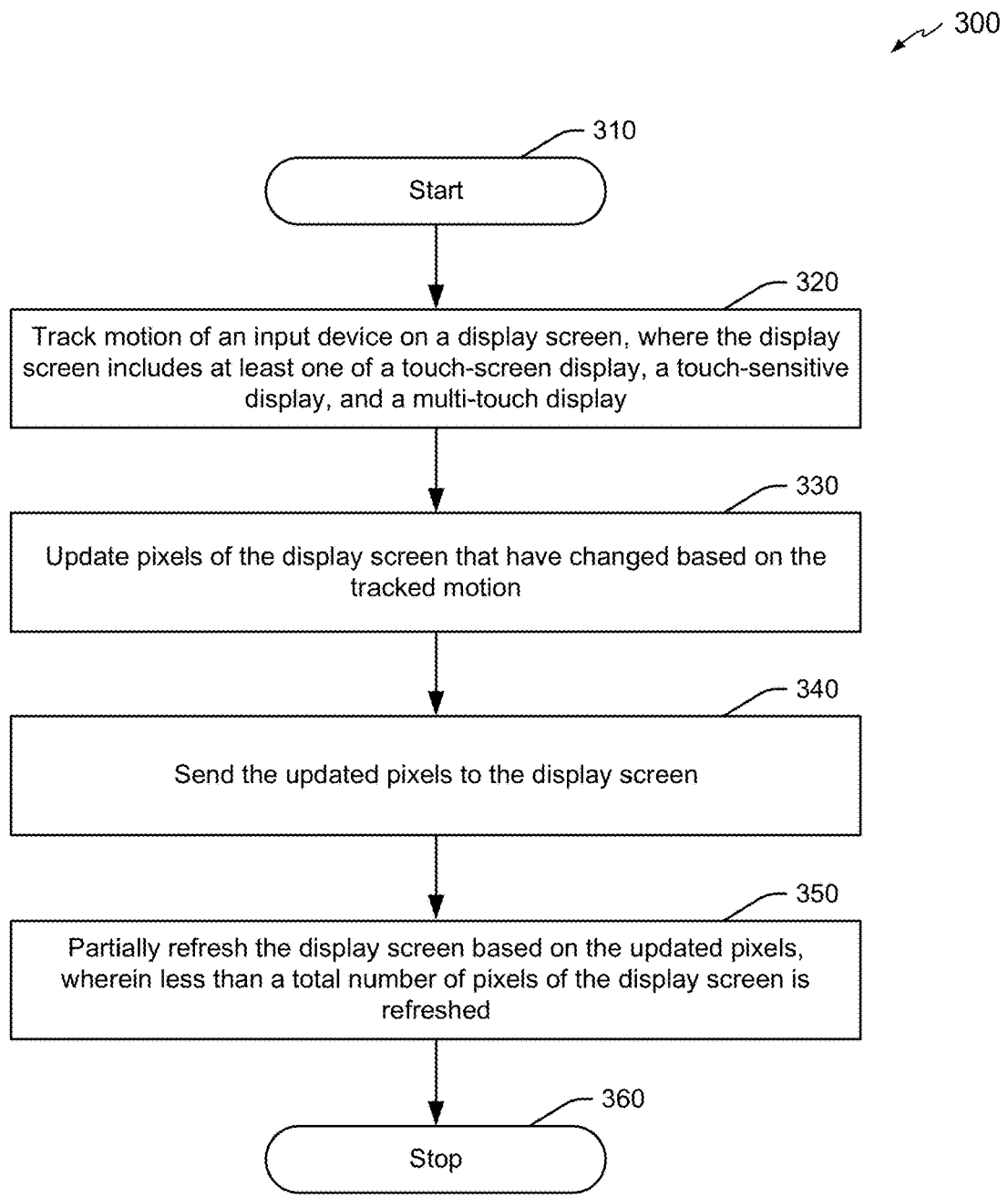
FIG. 3 depicts a flowchart of a method for implementing an interactive display, according to another example.

FIG. 2 depicts a flowchart of a method for implementing an interactive display, according to one example. It should be readily apparent that the processes depicted in FIGS. 2 and 3 represent generalized illustrations, and that other processes may be added or existing processes may be removed, modified, or rearranged without departing from the scope and spirit of the present disclosure. In addition, it should be understood that the processes may represent instructions stored on machine-readable storage medium that may cause a processor to respond, to perform actions, to change states, and/or make decisions. Alternatively, the process may represent functions and/or actions performed by functionally equivalent circuits like an analog circuit, a digital signal processing device circuit, an application specific integrated circuit (ASIC), or other devices associated with an interactive display. Furthermore, FIGS. 2 and 3 are not intended to limit the implementation of the present disclosure, but rather the figures illustrate functional information that one skilled in the art could use to design/fabricate circuits, generate software, or use a combination of hardware and software to perform the illustrated processes.

Method 200 may begin at block 210 and proceed to block 220, where motion of an input device on a display screen is tracked. For example, motion of the input device 112 on the display screen 104 may be tracked at a high tracking rate (e.g., 500 Hz, 1000 Hz) by the input sensor 108. The display screen may be a touch-screen display, a touch-sensitive display, or a multi-touch display.

Method 200 may proceed to block 230, where pixels of the display screen that have changed based on the tracked motion are updated. For example, the display controller 106 may selectively update pixels of the display screen that have changed based on user input (e.g., motion of the input device 112). Because the display controller 106 is configured to retain image data, pixels that have changed may be easily and speedily updated. Moreover, partial updating of the pixels of the display screen 104 may be performed by the display controller.

Method 200 may proceed to block 240, where portions of the display screen corresponding to the updated pixels are refreshed. For example, the partial refreshing of the display screen 104 may be performed, where portions of the display screen whose pixels have changed (or being updated) are refreshed. In certain examples, less than a total number of pixels of the display screen is refreshed, thereby improving the refresh rate of the display screen 104 and the response time of the display screen 104 to user input. Method 200 may then proceed to block 250, where the method 200 stops.

Method 300 depicts a flowchart of a method for implementing an interactive display, according to another example. Similar to mentioned above with respect to FIG. 2, it should be understood that the processes depicted may occur in an order different than depicted, or include more or less processes than depicted. Further, it should be understood that the figure illustrates functional information that one skilled in the art would use to design/fabricate circuits, generate software, or use a combination of hardware and software to perform the illustrated purposes.

Method 300 may begin at block 310 and proceed to block 320, where motion of an input device on a display screen is tracked. For example, motion of the input device 112 may be tracked by the input sensor 108, at a high tracking rate of at least 1000 Hz.

Method 300 may proceed to block 330, where pixels of the display screen that have changed based on the tracked motion are updated. For example, the display controller 106 may be configured to selectively update pixels of the display screen 104 that have changed as the user provides an input via the input device 112.

Method 300 may proceed to block 340, where the updated pixels are sent to the display screen. For example, updated pixels may be sent to the display screen via the high speed display interconnect 110.

Method 300 may proceed to block 350, where the display screen is partially refreshed based on the updated pixels, where less than a total number of pixels of the display screen are refreshed. For example, the response time of the display screen 104 to user input may be reduced to about 1 ms as a result of the partial updating of the display screen 104, compared to updating the whole display screen 104 when only a portion (e.g., portion 114) of the display screen 104 has been updated (or changed). Accordingly, user experience may be improved by providing a more fluid interaction and writing responsiveness of the display screen (e.g., natural pen/pencil responsiveness). Method 300 may then proceed to block 360, where the method 300 stops.

Figure 4:
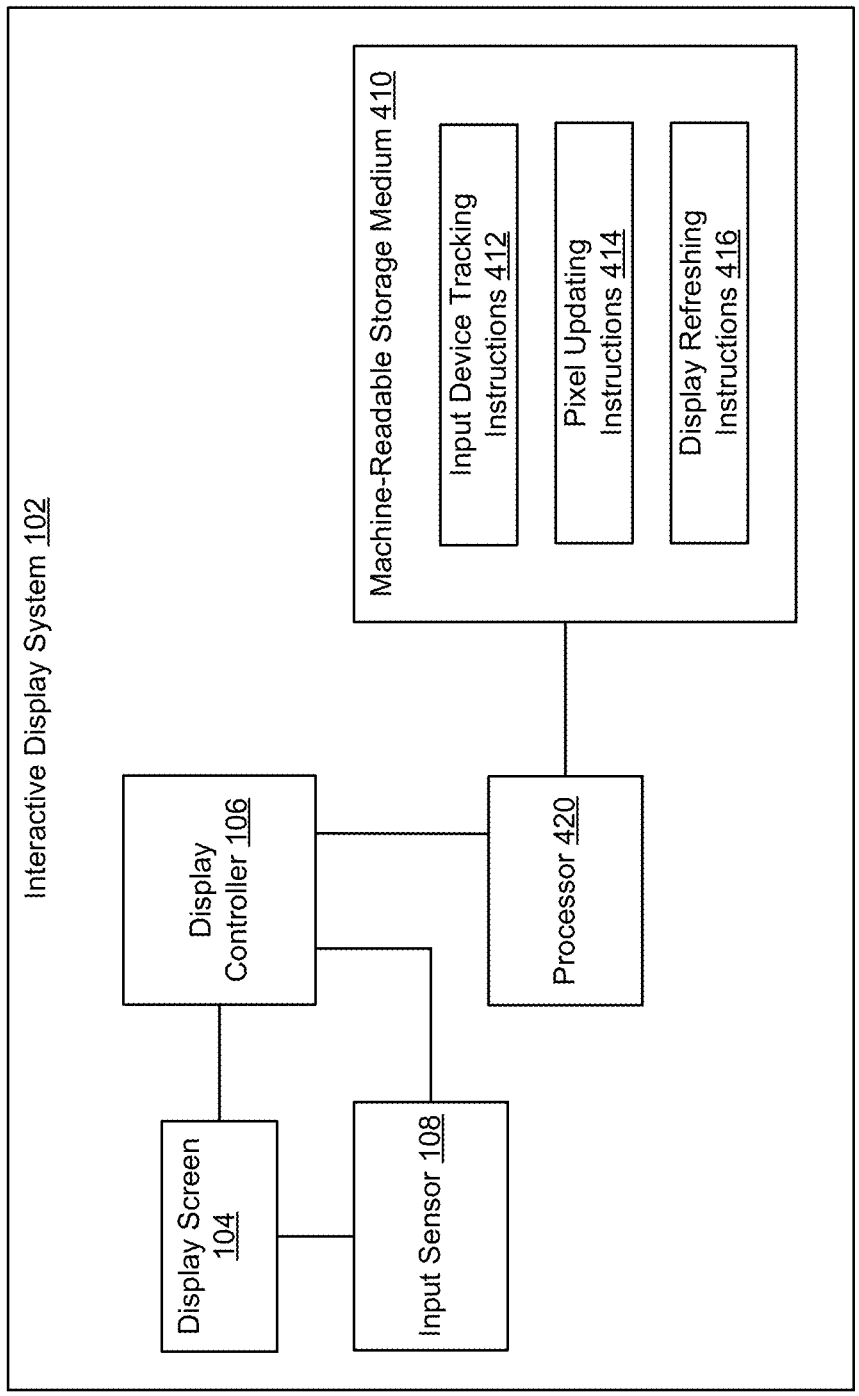
FIG. 4 depicts a block diagram of a non-transitory machine-readable storage medium encoded with instructions for operating an interactive display system, according to one example.

FIG. 4 depicts a block diagram of a non-transitory machine-readable storage medium encoded with instructions for operating an interactive display system, according to one example. The non-transitory machine-readable storage medium is generally referenced by reference number 410 and may be included with or external to the interactive display system 102. The non-transitory machine-readable storage medium 410 may correspond to any typical storage device that stores machine-readable instructions, such as programming code, software, firmware, or the like. For example, non-transitory machine-readable storage medium 410 may include one or more of a non-volatile memory, a volatile memory, and/or a storage device. Examples of non-volatile memory include, but are not limited to, electronically erasable programmable read only memory (EEPROM), flash memory, and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that can be executed by processor 420. In this case, the non-transitory machine-readable storage medium 410 may be a portable medium such as a CD, DVD, or flash drive or a memory maintained by a server from which the installation package can be downloaded and installed. In another implementation, the instructions may be part of an application or application already installed.

Processor 420 may generally retrieve and execute instructions stored in the non-transitory machine-readable storage medium 410 to operate the interactive display system 102 in accordance with the above-described examples. Processor 420 may be a microprocessor, a semiconductor-based microprocessor, other hardware devices or processing elements suitable for retrieval and execution of instructions stored in non-transitory machine-readable storage medium 410, or any combination thereof. Processor 420 may fetch, decode, and execute instructions stored in non-transitory machine-readable storage medium 410 to implement the functionality described below. As an alternative or in addition to retrieving and executing instructions, processor 420 may include at least one integrated circuit (IC), other control logic, other electronic circuits, or any combination thereof that include a number of electronic components for performing the functionality of instructions 412, 414, and 416 stored in non-transitory machine-readable storage medium 410. Further, processor 420 may include single or multiple cores in a chip, include multiple cores across multiple devices, or any combination thereof.

In one implementation, processor 420 may access the non-transitory machine-readable storage medium 410 via a bus. In some implementations, non-transitory machine-readable storage medium 410 may be integrated with the interactive display system 102, while in other implementations, the non-transitory machine-readable storage medium 410 may be a discrete component accessible by the interactive display system 102.

Non-transitory machine-readable storage medium 410 may include input device tracking instructions 412, which may be configured to track motion of an input device on a display screen. For example, motion of the input device 112 (e.g., a stylus) may be tracked on the display screen 104.

Non-transitory machine-readable storage medium 410 may include pixel updating instructions 414, which may be configured to selectively update pixels of the display screen that have changed based on the tracked motion and to send the updated pixels to the display screen. For example, pixels of the display screen that have changed based on the user input may be selectively updated, where other pixels that have not changed are not updated.

Non-transitory machine-readable storage medium 410 may include display refreshing instructions 416, which may be configured to refresh portions of the display screen corresponding to the updated pixels. For example, the display screen may be partially refreshed, where the partially refreshed portions of the display screen correspond to the updated pixels.

While the above disclosure has been shown and described with reference to the foregoing examples, it should be understood that other forms, details, and implementations may be made without departing from the spirit and scope of the disclosure that is defined in the following claims.

What is claimed is:

1. An interactive display system, comprising:
   a display screen;
   an input sensor to track motion of an input device at a predetermined tracking rate;
   a high speed display interconnect to connect the display screen to a graphics card of a display controller; and
   the display controller connected to the display screen by the high speed display interconnect, the display controller to:
   select a plurality of pixels, fewer than a total number of pixels, that have changed based on motion of the input device on the display screen determined during tracking,
   wherein the pixels are selected as input is detected by the input sensor;
   transmit pixel data directly to the display screen over the high speed display interconnect, the pixel data only including updates to the plurality of pixels that have changed, wherein the display controller is to transmit the pixel data as the plurality of pixels are selected with no artificial refresh rate limit, and
   retain image data, wherein the image data is retained within pixels of the display screen or in an integrated frame buffer of the display controller.

2. The interactive display system of claim 1, wherein the tracking rate is at least 500 Hz.

3. The interactive display system of claim 1, wherein the high speed display interconnect comprises at least one of a bi-directional image data path between the display controller and the display screen and a dedicated data path between the input sensor and the display controller, wherein the input sensor is connected to the display screen.

4. The interactive display system of claim 1, wherein the display screen comprises at least one of a touch-screen display, a touch-sensitive display, and a multi-touch display.

5. The interactive display system of claim 1, wherein the display screen is an organic light-emitting diode (OLED) screen.

6. The interactive display system of claim 1, wherein the input device comprises at least one of a stylus, a hand gesture, a pointing device, a clicking device, and a mouse.

7. A method for implementing an interactive display, comprising:
   tracking motion of an input device on a display screen, wherein the display screen comprises at least one of a touch-screen display, a touch-sensitive display, and a multi-touch display;
   selecting pixels that have changed based on and determined during the tracking, wherein the pixels are selected as input is detected an input sensor;
   transmitting, directly, as the pixels are selected, and with no refresh rate limit, a minimum bandwidth transmission from a controller to the display screen over a high speed connection, the minimum bandwidth transmission indicating updates to the selected pixels; and refreshing portions of the display screen corresponding to the selected pixels, wherein fewer than a total number of pixels of the display screen are refreshed.

8. The method of claim 7, further comprising storing display data in the total number of pixels or in an integrated frame buffer.

9. The method of claim 7, wherein refreshing portions of the display screen comprises:

sending the updated pixels to the display screen; and partially refreshing the display screen based on the updated pixels.

10. The method of claim 7, wherein a refresh rate of the display screen is at least 500 Hz and wherein a response time of the display screen to the input device is less than 2 ms.

11. A non-transitory computer-readable medium comprising instructions that, when executed, cause an interactive display system to:

track motion of an input device on a display screen;

select pixels of the display screen that have changed based on and determined during the tracked motion, wherein the pixels are selected as input is detected by an input sensor;

send directly, as the pixels are selected, to the display screen a transmission only including updates to the selected pixels that have changed with no artificial refresh rate limit to the transmission; and refresh portions of the display screen corresponding to the selected pixels.

12. The non-transitory computer-readable medium of claim 11, comprising further instructions that, when executed, cause the interactive display system to store the selected pixels in an internal frame buffer of the display screen.

13. The non-transitory computer-readable medium of claim 11, comprising further instructions that, when executed, cause the interactive display system to reduce a lag between motion of the input device and sending of the selected pixels to the display screen.

* * * * *